United States Patent
Gia et al.

(10) Patent No.: US 11,580,866 B2
(45) Date of Patent: Feb. 14, 2023

(54) UAV (UNMANNED AERIAL VEHICLE) LOGISTICS OPERATION AND AIR TRAFFIC CONTROL METHOD BASED ON BLOCKCHAIN TECHNOLOGY

(71) Applicant: Min-Chung Gia, Taipei (TW)

(72) Inventors: Min-Chung Gia, Taipei (TW); Chien-Liang Chen, New Taipei (TW); Kun-Ren Siao, New Taipei (TW)

(73) Assignee: Min-Chung Gia, Taipei (TW)

(*) Notice: Subject to any disclaimer, the term of this patent is extended or adjusted under 35 U.S.C. 154(b) by 457 days.

(21) Appl. No.: 16/795,982

(22) Filed: Feb. 20, 2020

(65) Prior Publication Data

US 2021/0264800 A1    Aug. 26, 2021

(51) Int. Cl.
*G08G 5/00* (2006.01)
*G06Q 50/28* (2012.01)
*G06F 16/27* (2019.01)
*H04L 9/32* (2006.01)

(52) U.S. Cl.
CPC .......... *G08G 5/0095* (2013.01); *G06F 16/27* (2019.01); *G06Q 50/28* (2013.01); *G08G 5/0034* (2013.01); *G08G 5/0069* (2013.01); *H04L 9/3236* (2013.01)

(58) Field of Classification Search
CPC .. G08G 5/0095; G08G 5/0034; G08G 5/0069; G08G 5/0043; G08G 5/0078; G08G 5/04; G06F 16/27; G06Q 50/28; H04L 9/3236
See application file for complete search history.

(56) References Cited

U.S. PATENT DOCUMENTS

| | | | |
|---|---|---|---|
| 2019/0025818 A1* | 1/2019 | Mattingly | H04L 9/3297 |
| 2019/0199534 A1* | 6/2019 | Beaman | H04L 9/3239 |
| 2019/0306757 A1* | 10/2019 | Husain | G05D 1/0011 |
| 2020/0372808 A1* | 11/2020 | Carraway | G08G 5/0069 |
| 2020/0372810 A1* | 11/2020 | Bosworth | G08G 5/0039 |
| 2021/0217317 A1* | 7/2021 | Ali | B64C 39/024 |

FOREIGN PATENT DOCUMENTS

WO    WO-2019086821 A1 *    5/2019

* cited by examiner

*Primary Examiner* — Mahmoud S Ismail
*Assistant Examiner* — Gabriel Anfinrud
(74) *Attorney, Agent, or Firm* — Chun-Ming Shih; HDLS IPR Services

(57) ABSTRACT

The present disclosure aims to implement UAV (unmanned aerial vehicle) logistics operation and air traffic control in flyable airspace technically through a UAV task planning system, which depends on blockchain technology to carry out UAV air traffic surveillance on flight segments in a predetermined barrier-free airway and optimize air traffic according to a safe separation distance for fewest UAV operators, air traffic controllers, communications links and airborne loads.

10 Claims, 7 Drawing Sheets

UAV (UNMANNED AERIAL VEHICLE) LOGISTICS OPERATION AND AIR TRAFFIC CONTROL METHOD BASED ON BLOCKCHAIN TECHNOLOGY

BACKGROUND OF THE INVENTION

1. Field of the Invention

The present disclosure relates to logistics, particularly a UAV (unmanned aerial vehicle) logistics operation and air traffic control method based on blockchain technology.

2. Description of the Prior Art

Currently, most unmanned aerial vehicles (UAVs) fly within a visual range, searching unexpected barriers by sensors or visual detectors, and taking actions such as hovering, raising or lowering flight altitudes and evading sideway for collision prevention. Because of uncertainty in the air, UAVs must be launched in open areas restrictively and is prone to hit topographical barriers and being destroyed.

Furthermore, a conventional UAV flies solo through remote control without a mechanism for air traffic control among several UAVs. That is, the safe airspace is available to only one single UAV rather than more UAVs or another unexpected UAV intruder that probably perturbs the airspace or causes air crashes.

Accordingly, the locations and applications of UAVs restricted to the above problems are limited nowadays and UAVs used to take photos at scenery spots only fail to execute long-range flight missions or applications such as over-the-horizon logistics operation.

SUMMARY OF THE INVENTION

The present disclosure aims to provide an UAV (unmanned aerial vehicle) logistics operation and air traffic control method based on blockchain technology with which tokens are created in a predetermined barrier-free airway for UAV air traffic control and fewest UAV operators, air traffic controllers, communication links and airborne loads.

An UAV logistics operation and air traffic control method based on blockchain technology in the present disclosure depends on features of blockchain technology to ensure safety and accuracy of UAV flights and avert unexpected inferences for promotion of UAV logistics operation effectively.

With a barrier-free airway planned by a UAV flight task planning system in advance technically, UAVs equipped with various airborne environment sensors/detectors for camera visual imaging or lidar point clouds are able to detect unexpected barriers in limited space of a current flight segment in an airway and recognize and respond to the barriers quickly. Because of a limited detection range in airspace, computing and processing for visually remote-control flight and collision prevention are minimized.

The present disclosure incorporates applications of blockchain technology. As a method to record transaction (communications) messages, the blockchain relies on a distributed data structure to reproduce and share information among members on a network. For a designated activity, all transaction copies will be preserved in all nodes distributed on a network completely. Compared with concentrative record storage, the blockchain has many competitive advantages. In a blockchain, each block will refer to a hash of its previous block. Based on this mechanism, a chain is developed between blocks for creation of a chain or a blockchain. A node with an authority to access a blockchain list is capable of reading a blockchain and clearly learning all situations of data exchanged on a network for uniqueness, effective confidentiality and no falsification.

The present disclosure further incorporates a permissioned blockchain infrastructure. Compared with other blockchains, a permissioned blockchain is characteristic of advantages of good confidentiality, high through-put and definite finality. In these characteristics, confidentiality for applications of blockchain encrypted-data communications technology ensures a node authorized and joining the blockchain only is granted the knowledge and access right for the blockchain.

Through-put which is a criterion to measure a transaction (instruction communication) volume based on a time interval is taken as the speed of data written into a blockchain per second in the blockchain infrastructure. On the other hand, the efficiency of a blockchain in which lots of nodes are synchronized is traded off and affected inevitably. In contrast to most public blockchains, a private blockchain is good in fast transactions, internal privacy and high through-put because incentives for miners are excluded from consensus design of a private blockchain in which expansibility is balanced with through-put and the node count.

Finality means certainty and difficulty to keep integrity of a blockchain infrastructure without revocation.

Accordingly, a UAV logistics operation and air traffic control method based on blockchain technology is implemented in accordance with pre-task planning, barrier detection and removal, and applications of blockchain technology.

DETAILED DESCRIPTION OF THE PREFERRED EMBODIMENTS

A UAV (unmanned aerial vehicle) logistics operation and air traffic control method based on blockchain technology is demonstrated in the preferred embodiments and accompanying drawings for clear understanding of purposes, technical measures and advantages. The embodiments hereinafter are used to explain but not limit the present application.

The present disclosure relates to an unmanned aerial vehicle logistics operation and air traffic control method based on blockchain technology for a UAV logistics transportation task management system with which airspace capacity planning, air traffic control and air traffic monitoring in flyable airspace are implemented, as described in detail hereinafter.

<Scenario for UAV Logistics Transportation Based on Blockchain Technology>

Figure 1:
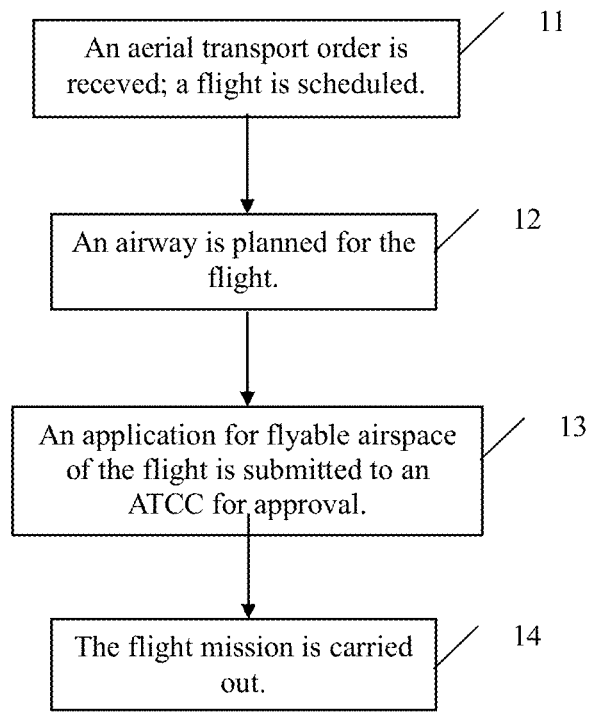
FIG. 1 is a flowchart for steps of UAV logistics operation based on blockchain technology.

Referring to FIG. 1 for steps to implement UAV logistics operation:

11. An aerial transport order placed by a client is received by an UAV logistics operation center from which a flight is scheduled;

12. Airway planning for the flight is made completely in a task planning system according to a departure place and a destination;

13. An application for flyable airspace of the flight is submitted to a UAV air traffic control center (ATCC) for approval; and 14. The flight mission is carried out by a UAV pilot with the application for flyable airspace approved by ATCC.

The detailed information for the flight, that is, aerial transport order, planned airway and UAV electronic ID tag, is integrally encrypted and packetized for planning, management and control of airspace capacity based on blockchain technology; moreover, the detailed information and current status for the flight is monitored and broadcasted by the ATCC for the flyable airspace.

In practice, each of an ATCC, a UAV pilot and a flight for an airway is taken as a node and a variety of information for UAV, flight and airway is recorded with a blockchain infrastructure for creation of a block.

Next, a plurality of waypoints are planned for the airway and a distance between two waypoints is defined as a flight segment. When a waypoint is passed by the flight, a relative block will be broadcasted to other participating nodes on the blockchain network in which a waypoint just passed by and/or a next waypoint to be passed by the flight and/or another flight and a block consisting of timestamps are recorded. Thus, air traffic status of all flights in an airway and availability of a flight segment are added into broadcasted information of the blockchain network for data consistency among all participating nodes.

Monitoring real-time service conditions of an airway for appropriate traffic control, ATCC optimizes availability of an airway, ensuring a safe separation distance between flights and collision prevention and avoiding events jeopardizing air safety such as malicious invasion, tampering, hacker's hijacking or illegal manipulation.

<Application of Blockchain Technology for Smart UAV Air Traffic Control>

Figure 2:
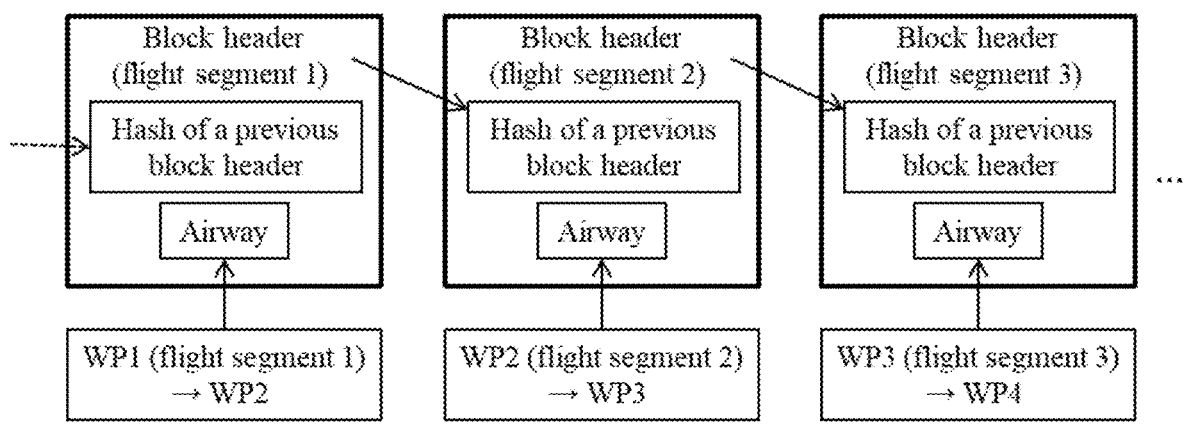
FIG. 2 is a block diagram for the blockchain infrastructures on nodes.

Based on steps mentioned previously, the blockchain technology in the present disclosure is further explained hereinafter. As shown in FIG. 2, the blockchain technology in the present disclosure is classified into the permissioned blockchain infrastructure. For multiple flights existing in an airway, each of the flights should be confined to a specific flight segment and status that a flight has passed a waypoint (WP) n in a block must be broadcasted to other participating nodes on a blockchain network. The detailed information for UAVs comprising registered electronic ID certification, electronic fence, waypoint position, UAV flight status, airway, etc. should be recorded in each node.

Figure 3:
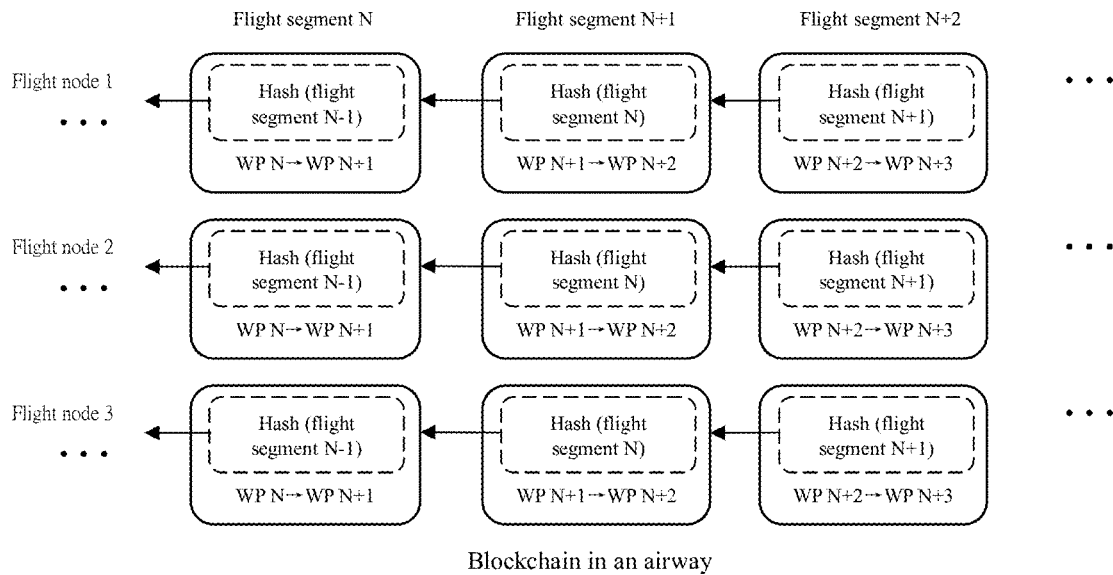
FIG. 3 is a block diagram for the blockchain infrastructures in an airway.

Referring to FIG. 3, which illustrates each node (UAV flight) for a flight mission under a blockchain infrastructure is accepted and encrypted by a public key that is generated with the node's own private key, that is, the block for the flight should be signed with a private key of the ATCC and re-encrypted with a public key of the flight. The public key of the flight is encrypted with a private key of the flight such that data is consistent between nodes, fast submitted and uneasily tampered for plentiful service functions. Moreover, instructions of the ATCC or position replies of a flight, each of which are executed with the blockchain-based encrypted transaction technology, can be read by a node with the authority to access a forward/backward link block for overall status of received data that is being exchanged in an airway.

For applications of air traffic control and flight operation within a flyable airspace, each node (UAV flight) itself is a part of a blockchain; the blockchain could be regarded as a real-time flight log of a specific UAV flight. In a real-time flight log, a waypoint which is being passed by a flight, a next waypoint to be passed by the flight, and a block consisting of timestamps will be recorded and packetized. A segment between two waypoints (N and N+1), a previous segment and a next segment are defined as a flight segment N, a flight segment N−1 and a flight segment N+1, respectively. Each block is labeled with an encrypted hash. Each block will refer to a hash of a passed block, i.e., a previous flight segment. A chain will be developed in blocks for creation of the blocks or the blockchain.

Each block in a blockchain consists of two parts, block header and block body, as explained hereinafter.

Block Header

The data elements in a block header include: version number; hash of a previous block, which is used in creation of a chain between a current block and a previous block for the sequence of blocks and accuracy of a passed block and greater than a hash of the current block definitely; hash of a path-segment tree root node; timestamp. A block header features a fixed size of x bytes. The example for data elements in a block header is shown in Table 1.

TABLE 1 example for data elements in a block header

| Name | Description | Size |
| --- | --- | --- |
| Version number | Version number for data of a block | x bytes |
| Record of the previous block | Hash calculated from the block header of the previous block | x bytes |
| Path-segment tree root node | Result calculated by a task planning system for a current block | x bytes |
| Pat-segment tree root | Hash of a path-segment tree root node | x bytes |
| Time stamp | Timestamp (UTM time format) generated from a current block | x bytes |

Block Body

A block body comprises all information for production of a block. In an example of a flight mission, UAV information consists of flight plan, registered electronic ID, departure point, destination, detailed flight & airway and information reply (Tx) of a flight passing a waypoint in an airway and is represented in the form of a path segment tree. In blocks for flight segments, transactions about waypoints and/or flight segments flown in or out by a UAV will be recorded collectively. There are lots of records in a flight mission and each of the records is enquired according to its own index number. The example for data elements in a block body is shown in Table 2.

TABLE 2 example for data elements in a block body

| Name | Description | Size |
| --- | --- | --- |
| Registered UAV electronic ID certification | Electronic registration; electronic ID | x bytes |
| Detailed information for an airway and a flight | Current flight number; load; departure point; destination; waypoint coordinate; flight segment information; flight altitude; flight speed; distance | x bytes |
| Labels for a departure point and a destination of a flight segment in a current block | Coordinates of a departure point and a destination for a recorded flight segment in a current block | x bytes |
| Information of a completed flight segment | Replies of recorded flight segments in a current block | x bytes |
| Time stamp | Replies of verified timestamps (UTM time format) generated and recorded in a current block | x bytes |

Furthermore, each of the records further comprises generated time, hashes for waypoints or flight segments flown in or out by a flight, index numbers of in-out records, departure point & destination, waypoint coordinates and distance of each flight segment. Because a hash for the path segment tree root is given to each record and taken as a part of the path segment tree, any address cannot be transacted repeatedly or falsified. The data structure of each record is shown in Table 3.

TABLE 3 example for the data structure of each record in a block body

| Name | Description | Size |
| --- | --- | --- |
| Generated time | Time embedded into a block for a current reply | x bytes |
| Hash of a referred reply | Hash of a path-segment tree root node | x bytes |
| Index tag of a reply record | Index tag of a current reply record | x bytes |
| Coordinate of a departed waypoint | Coordinate of a departed waypoint in a flight segment | x bytes |
| Coordinate of an arrived waypoint | Coordinate of an arrived waypoint in a flight segment | x bytes |
| Times of completed replies in a flight segment | Times of completed replies | x bytes |
| Digital signature of a reply | Digital signature of a reply | x bytes |
| Record size | Size of each reply record | x bytes |
| Protocol version | Protocol version number | x bytes |

Based on this structure of a block header and a block body, all information about flight status and availability of a flight segment are added into messages to be broadcasted on the network for dynamic applications of air traffic control. A blockchain-based air traffic control method can be applied to traffic management for optimized use of an airway, safe separation distance between flights, collision prevention, and no events jeopardizing air safety such as malicious invasion, tampering, hacker's hijacking or illegal manipulation in addition to real-time surveillance of airspace in service.

The procedure for applications of a blockchain to a flight mission (FIG. 4) and the calculation of a hash (FIG. 5) are explained in following sections.

1. Information of each waypoint passed by a flight is first broadcasted to other participating nodes (ATCC, UAV pilot and other flights) on a blockchain network;
2. A number of new flight status (Tx) are sent to a block by all nodes and several unverified hashes of Tx are collected in the block by all nodes wherein multiple Tx can be included in each block;
3. A node (amid ATCC and other nodes before and after ATCC) to encrypt Tx is decided;
4. A node which is granted the authority to encrypt Tx and complete encryption early will broadcast a new block to other participating nodes;
5. The new block is verified by and connected to all nodes;
6. Tx is authenticated completely.

Figure 4:
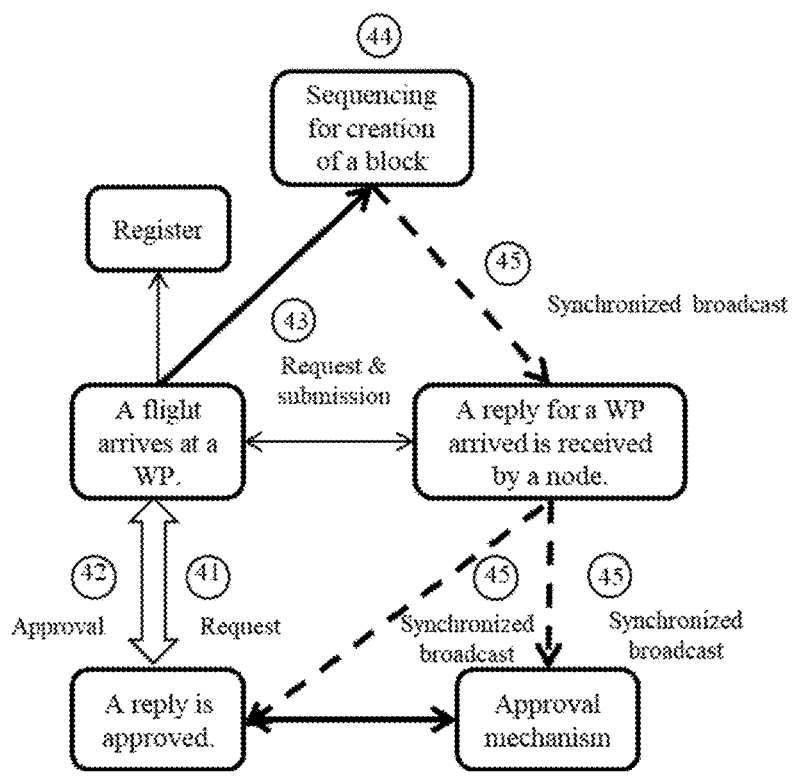
FIG. 4 is a flowchart for processing in a blockchain.
Figure 5:
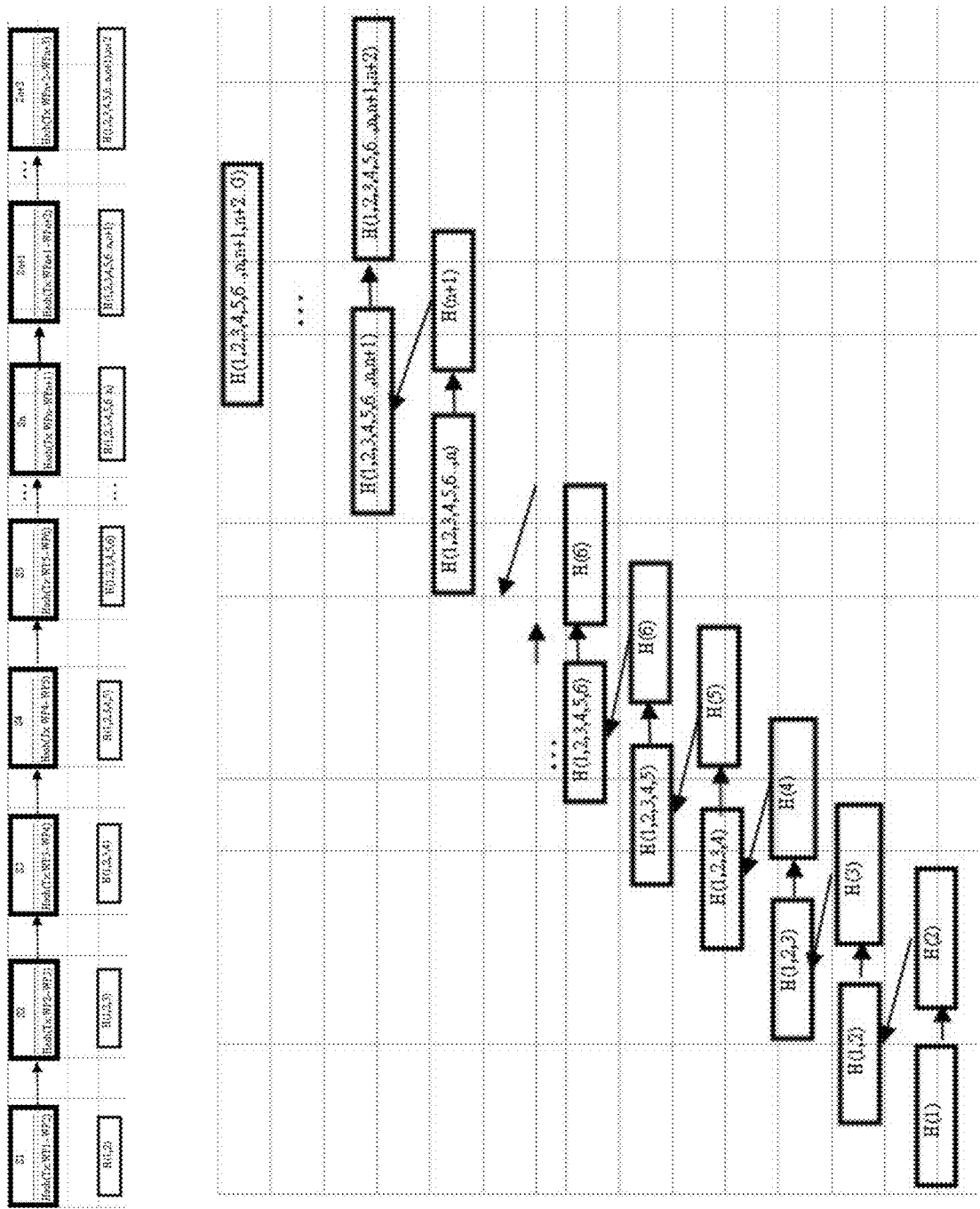
FIG. 5 is a schematic view for steps of calculating a hash in a blockchain.

In the above procedure, the steps for blockchain processing in FIG. 4 are shown as follows:
41. The availability of a waypoint (WP) to be passed by a flight is confirmed in advance;
42. The flight will head for the waypoint after the status of the waypoint available is verified;
43. Information of a new position of the flight having arrived at the waypoint is submitted to a blockchain;
44. The new position of the flight is written into the position of a new block;
45. Information of the new block in which the flight is written is broadcasted to other nodes simultaneously and verified by and written into all nodes.

According to the above description for applications, a transaction procedure based on operation of the blockchain for air traffic control of a UAV flight is shown as follows:
1. The node of ATCC launches a flight mission of UAV flight X for an airway in order to process encryption of a public key produced by the private key of the node of UAV flight; the detailed UAV electronic ID tag is known to each node and any instruction unapproved or tampered, which has been detected during a verification step at a node, is neither written into a block nor executed;
2. The message instruction is sent to a node for broadcasting a newly accepted transaction to all participating nodes;
3. The message instruction for the UAV flight at the node is verified as a correct and non-tampered instruction such that a flight plan (for example, a planned airway) for the UAV flight X is executed and a calculated hash is written into a block;
4. The calculated hash is broadcasted to all nodes, each of which will initiate a write-in step for completion of a block and data consistency;
5. The instruction correctly written into a block is verified, decrypted by the private key of the UAV flight X and received;
6. The UAV flight X (node) in a flight mission broadcasts its real-time position and a token for relevant data, for example, a waypoint in a planned path was passed or a previous flight segment safely passed is available, to all nodes according to previous steps for encryption/decryption operated repeatedly.

Development of a Consortium Blockchain

Figure 6:
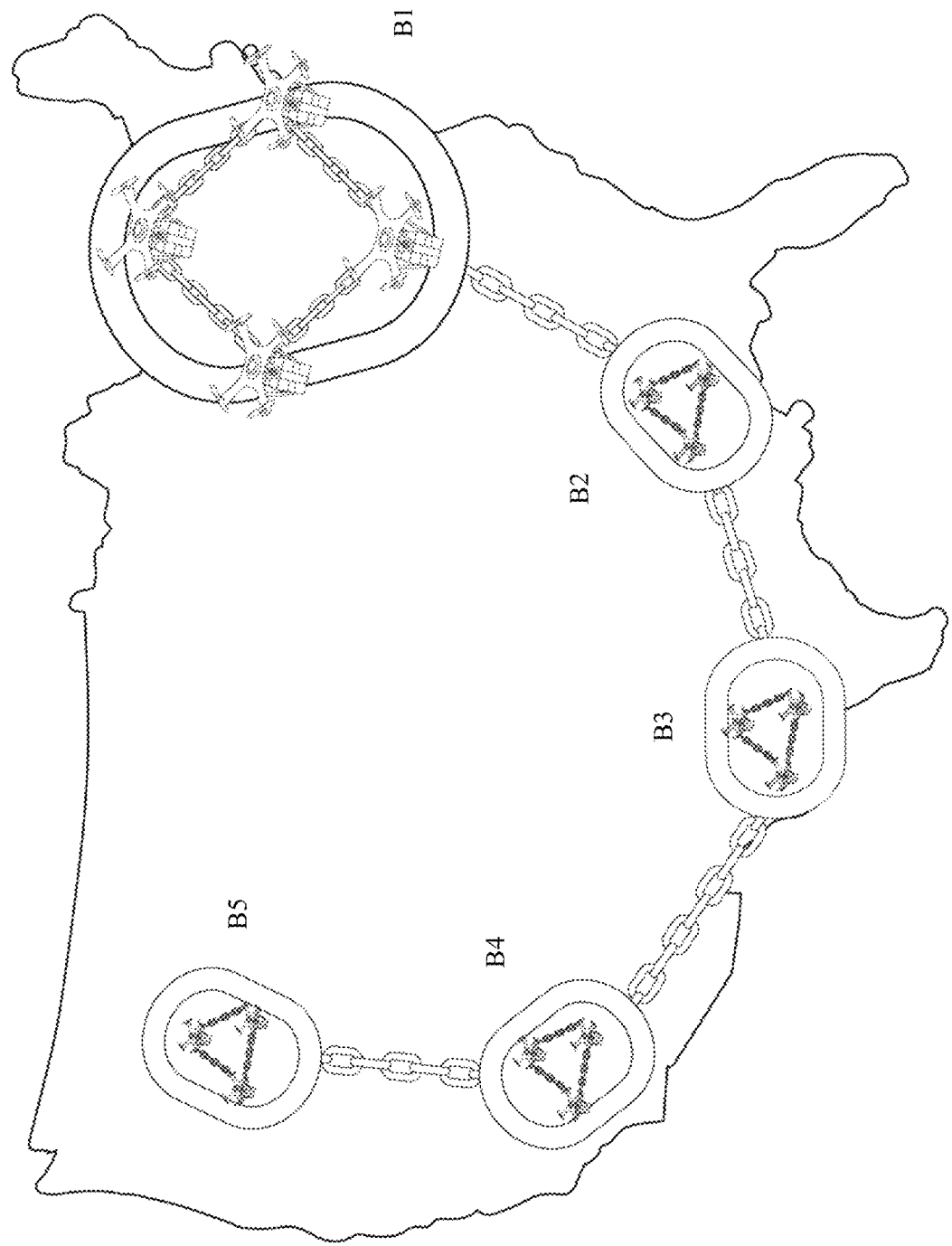
FIG. 6 is a schematic view for development of a consortium blockchain with blockchains connected with one another in series.

As shown in FIG. 6, a consortium blockchain, which is applicable to B2B scenarios such as communications, transactions or liquidations between UAV transportation task management systems operated by different organizations, is developed by different manufacturers' blockchains of B1 to B5, all of which are connected with one another in series for creation of a blockchain inside another blockchain. In ordinary situations, a consortium observer who issues an enquiry cannot make a transaction. A consortium blockchain is a blockchain with its consensus process controlled by a pre-determined node. A blockchain which is probably accessed by everybody features both a root hash and an API (Application Interface) available to the general public, who makes limited enquiries through the API and receives information of status for a blockchain.

In addition to previous applications of blockchain technology, other functions of traffic control and collision prevention attainable in the present disclosure are further explained in detail.

Embodiment of Smart UAV Traffic Control and Collision Prevention

1. A flight mission in airspace is systematically planned in advance and air traffic for a fixed airway with several flight segments is monitored by a blockchain-based mechanism controllably. For safety surveillance of a flight, the detailed information of the UAV flight such as registered electronic ID certification, electronic ID, electronic fence, airway, waypoint coordinates, flight segments passed by the flight and waypoint records are saved in block bodies. In a blockchain, each block should include a block header and a block body. ATCC employs above information to monitor the flight controllably, for example, overall air traffic status in an airway and real-time surveillance of air traffic at all flight segments.

2. Air channels are planned along a fixed airway with several flight segments in airspace based on the concept of pipeline; a constant UAV flying speed and a safe separation distance between UAVs as required are set according to a blockchain-based node reply mechanism; multiple UAV flights are arranged in different air channels inside an identical flight segment simultaneously or deployed at front and rear ends of an identical air channel for optimum utilization of an airway.

3. Because of flyable airspace modeling on the basis of smart airway planning systematically in the present disclosure, an airway consists of a group of waypoints in which two consecutive waypoints constitute a flight segment and several flight segments make up the airway. Determined by the resolution of a UAV flight database, the basic length of a flight segment could be an integral multiple of the resolution provided by geographic information; the distances of flight segments in an airway could be different from one another.

Figure 7:
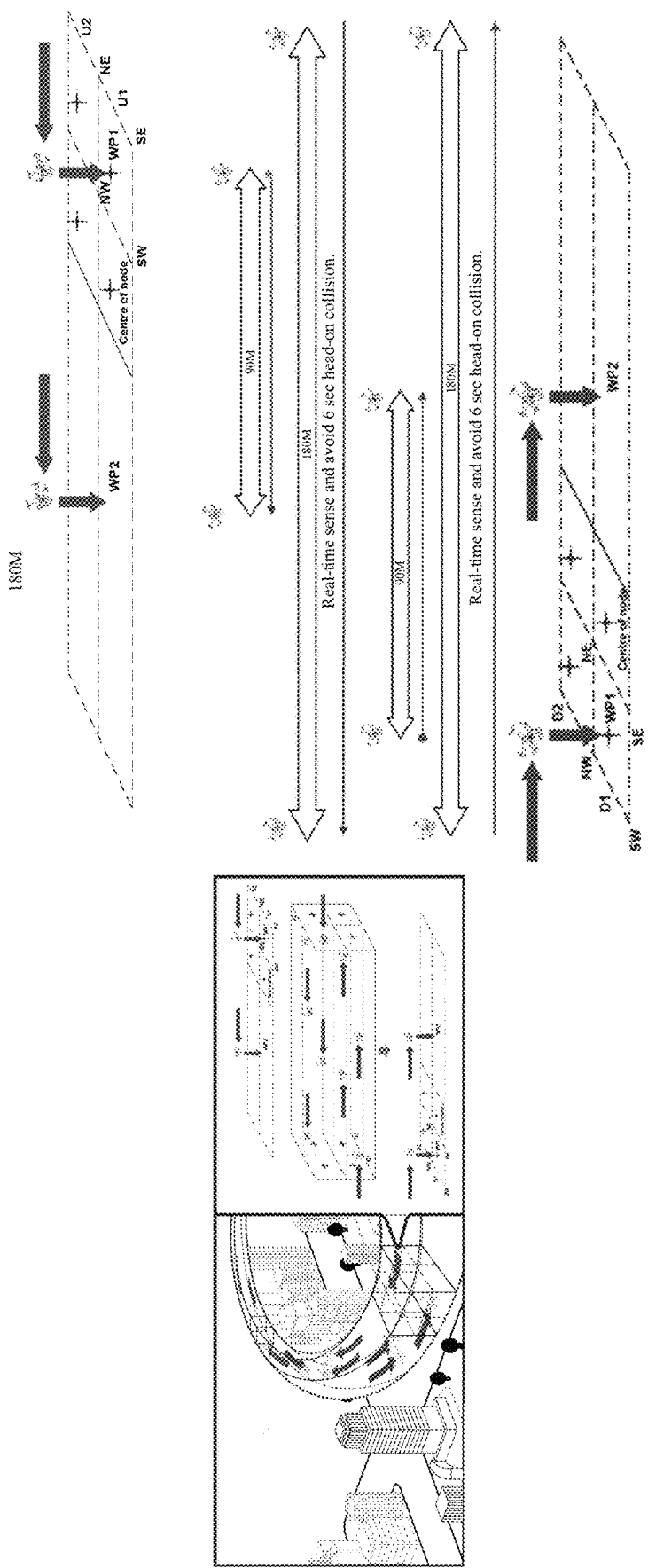
FIG. 7 is a scenario for a safe separation distance between UAVs and air traffic control in created air channels.

For example, as shown in FIG. 7, two upside air channels, U1 and U2, and two downside air channels, D1 and D2, planned in an airway are "GO" and "RETURN" paths for a UAV flight, respectively. The waypoints, WP1 and WP2, are decided by center points of four corners, NE, NW, SE and SW, of the air channels. In the case of the flight with a resolution of 90 m, a flight segment can be 90 m, 180 m, 270 m, etc. If a UAV flies at a speed of 15 m/sec, the basic flight time of the UAV flight in a flight segment is an integral multiple of 6 seconds.

In practice, the safe separation distance between two UAV flights is decided with an algorithm and relative parameters or derived from the performance index of a UAV flexibly. In virtue of introduction of blockchain technology, flight status of a UAV flight having passed a waypoint is broadcasted to other members on the network through a token mentioned previously. Accordingly, safe barrier-free flight segments to be passed by all other UAV flights subsequently are known and several available flight segments which have been passed are released. With these basic conditions confirmed, flexible air traffic control is feasible for no misadventure like rear-end collision and a safe separation distance between two flights.

Figure 8:
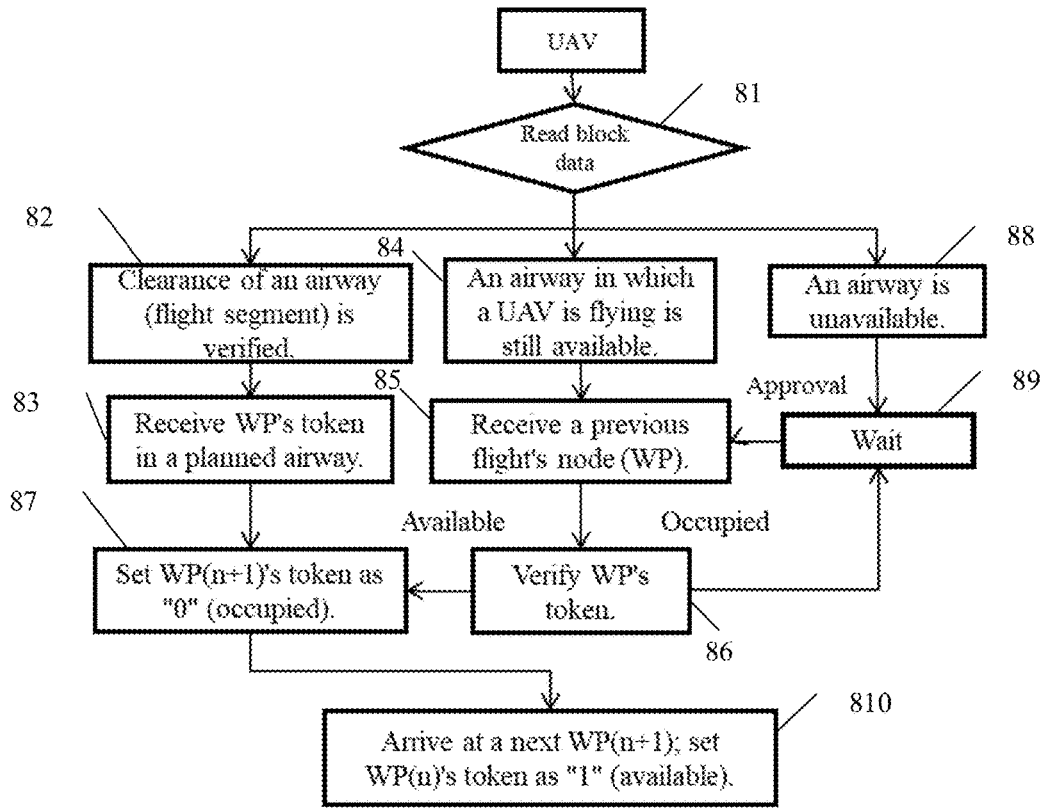
FIG. 8 is a flowchart for a safe separation distance between UAVs and air traffic control with a token for a flight segment in an airway embedded in a blockchain.

After a database for flyable airspace is modeled, both planning/design of an airway and simulations of a flight mission depend on defined flight parameters, which comprise a safe width of an air channel, a basic length of a flight segment, a required safe separation distance, a UAV flight speed, a blockchain mechanism, etc. attributed to a modeling resolution, to derive a mechanism optimizing an UAV flight speed and a safe separation distance in a fixed airway with several flight segments for maximum utilization of an airway and safe air traffic, as shown in FIG. 8 for an embodiment.

Step 81: Data in a blockchain through which airway conditions are confirmed is read by a flight.

Step 82: The clearance of an airway is verified and tokens for all waypoints, WP, are received in step 83.

Step 84: Information of other UAV flights detected and flight segments available in an airway is received and the waypoint of the previous flight segment only is derived in step 85. The status of token of the waypoint is set to "Available" (labeled as "1") in step 86; the status of token of the next waypoint, WP (n+1), is set to "Occupied" (labeled as "0") in step 87.

Step 88: The status of token of a waypoint to be arrived is set to "Occupied" or there is no flight segment available in an airway. Step 89, waiting, is initiated. When a flight arrives at the next waypoint, WP (n+1), successfully, the previous waypoint, WP (n), is set to "Available" in step 810.

Figure 9:
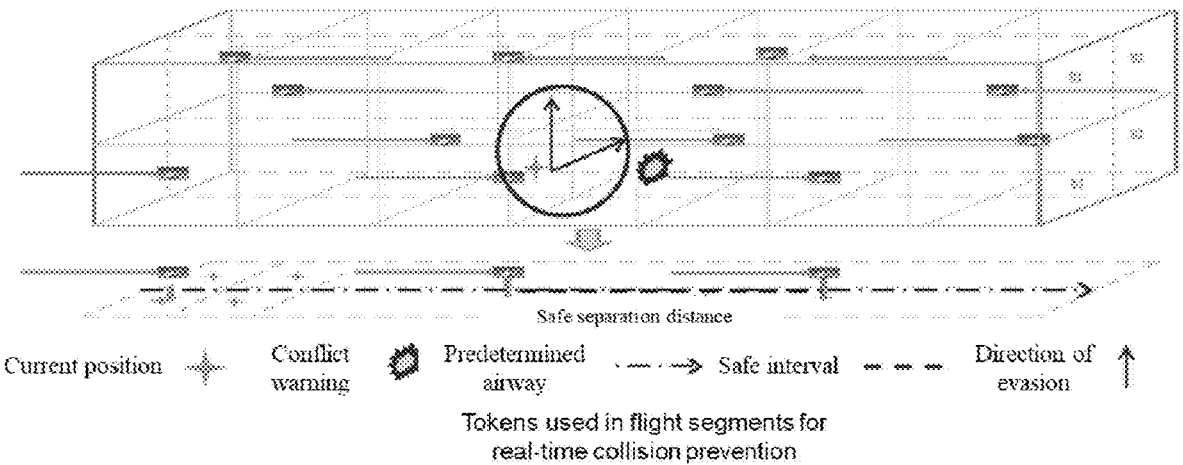
FIG. 9 is a scenario for real-time collision prevention in applications of a token for a flight segment.

4. If there is any unplanned event in a flight segment, for example, a flight detecting a barrier and hovering in the air to prevent a collision, the blockchain mechanism will respond to the overall air traffic control and process air traffic. Theoretically, an air channel is one part of a fixed airway, safe and barrier-free, created by a task planning system and the time consumed from a risky object detected by a flight to removal of the object should be brief (FIG. 9).

5. A UAV flight mission is carried out by a multirotor mostly, which hovers in the air to complete detections, make a decision and take an action within the basic length of a flight segment. All affected UAV flights in an airway will respond simultaneously, for example, hovering, speed adjustment or change to another flight segment after receiving messages broadcasted on the blockchain.

Figure 10:
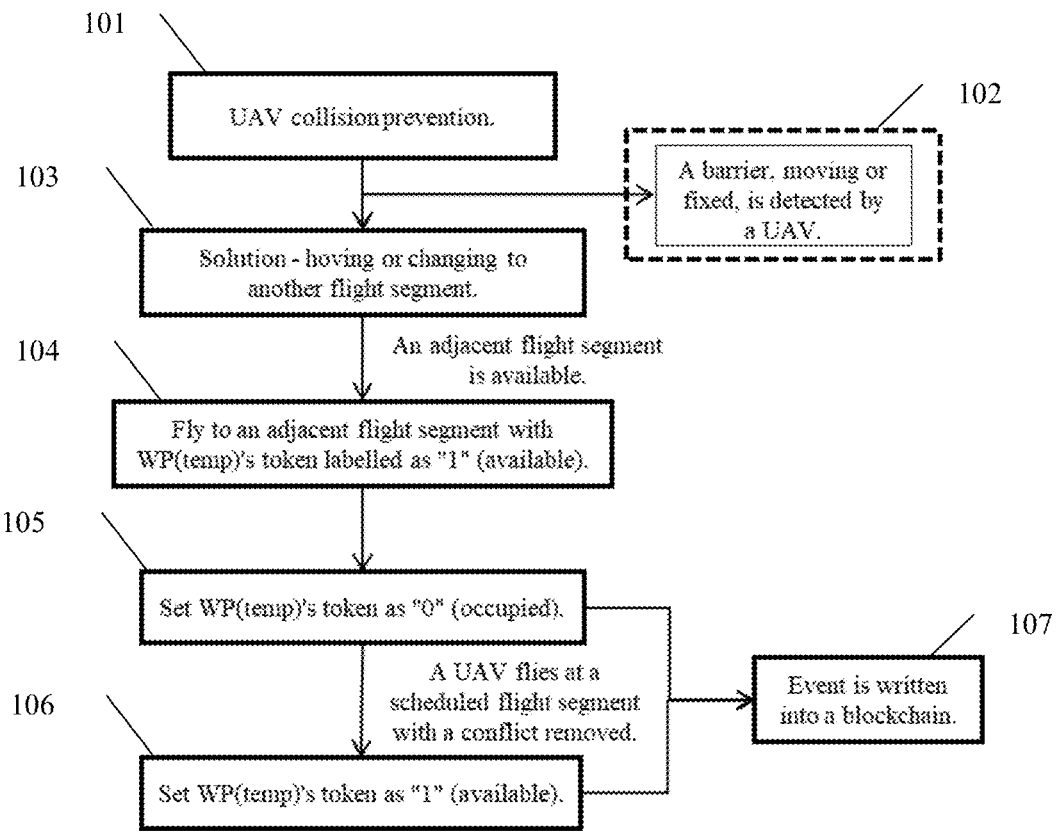
FIG. 10 is a flowchart for collision prevention and an airway change based on a token in a blockchain.

FIG. 10 illustrates UAVs fly in an airway or air channels similar to a multi-lane freeway in concept. In step 101, real-time detections at flight segments are conducted for collision prevention; a UAV flight confronting an unexpected barrier in step 102 takes an evasive action to change an air channel in step 103, select a waypoint WP (temp) with the higher priority (nearest; forward) from captured real-time data for all flight segments (up, down, left and right) in step 104, and head for a waypoint, WP (temp) with status set to "Occupied", in step 105.

When a detected barrier disappears, a UAV flight will return to the original waypoint WP (n) and the status of waypoint WP (temp) is set to "Available" in step 106. Finally, an event of emergent collision prevention is recorded in a blockchain simultaneously in step 107.

6. If a UAV flies in an unfixed airway in airspace or changes to a new airway during a flight mission according to an instruction, the non-scheduled airway could be offered from ATCC on the ground or planned by the UAV itself. With blockchain technology introduced in the same time, a new airway is planned based on the flight segment in which a UAV receiving an instruction flies and a waypoint taken as a new departure point. For multiple airways existing in airspace, the blockchains for all airways could be integrated for real-time surveillance as well as early warning and systematical air traffic control under ATCC in the case of any conflict.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A UAV (unmanned aerial vehicle) logistics operation and air traffic control method based on blockchain technology, applied to a UAV, comprising functions to receive an aerial transport order, arrange a flight, make airway planning and submit an application for flyable airspace to an ATCC (air traffic control center) for approval, and carry out a flight mission by a UAV pilot and characterized in that:

taking each of the ATCC, the UAV pilot and the flight in an airway as a node and recording a variety of information for the UAV, the flight and the airway with a blockchain infrastructure for creation of a block;

planning a plurality of waypoints for the airway and defining a distance between two waypoints as a flight segment, wherein the block related to a waypoint passed by the flight is broadcasted to other participating nodes on a blockchain network in which the waypoint just passed by and/or a next waypoint to be passed by the flight and/or another flight and the block consisting of timestamps are recorded such that air traffic status of all flights in the airway and availability of the flight segment are added into broadcasted information of the blockchain network for data consistency among all participating nodes;

monitoring real-time service conditions of the airway by the ATCC for traffic control optimizing availability of the airway to ensure a safe separation distance between flights and collision prevention, and to avoid events jeopardizing air safety of malicious invasion, tampering, hacker's hijacking or illegal manipulation, wherein a procedure for the flight mission comprises steps as follows:

broadcasting information of each waypoint passed by the flight to the other participating nodes on the blockchain network;

collecting several unverified hashes for flight status in the block by all nodes such that the block comprises multiple flight statuses;

deciding the node to encrypt the flight status based on a protocol;

the node which is granted an authority to encrypt the flight status and complete encryption broadcasting a new block to the other participating nodes;

verifying and connecting the new block to all nodes; and authenticating all flight statuses completely.

2. The UAV logistics operation and air traffic control method based on blockchain technology as claimed in claim 1 wherein the blockchain infrastructure is a permissioned blockchain infrastructure.

3. The UAV logistics operation and air traffic control method based on blockchain technology as claimed in claim 1 wherein the block for the flight is signed with a private key of the ATCC and re-encrypted with a public key of the flight, which is encrypted with the private key of the flight for data consistency between the nodes.

4. The UAV logistics operation and air traffic control method based on blockchain technology as claimed in claim 1 wherein the block consists of (a) a block header comprising version number, records of a previous block, path-segment tree root nodes and timestamps and featuring a fixed size and (b) a block body comprising registered UAV electronic ID certification, detailed information for the airway and the flight, labels for a departure point and a destination of the flight segment in a current block, information of a completed flight segment and the timestamps.

5. The UAV logistics operation and air traffic control method based on blockchain technology as claimed in claim 4 wherein the block body further comprises generated time, hash of a referred reply, index tag of a reply record, coordinate of a departed waypoint, coordinate of an arrived waypoint, times of completed replies in the flight segment, digital signature of a reply, record size and protocol version.

6. The UAV logistics operation and air traffic control method based on blockchain technology as claimed in claim 1 wherein a transaction procedure for the flight in the blockchain comprises steps as follows:

the ATCC launching the flight mission of the flight for the airway in order to process encryption with a public key produced by a private key of the flight that owns a detailed UAV electronic ID tag for the block wherein an instruction for the flight mission, which is unapproved or tampered and detected during verification, is neither written into the block nor executed;

sending the instruction for the flight mission to the flight for broadcasting a new transaction to all participating nodes;

enabling the flight mission of the flight and writing a calculated hash into the block for the flight after the instruction for the flight mission is verified as a correct and non-tampered instruction;

broadcasting the calculated hash to all nodes, each of which initiates a write-in step for completion of a block and data consistency;

writing the instruction correctly written into a block is verified, decrypted by the private key of the flight and received;

the flight in the flight mission broadcasting a real-time position and a token for relevant data, the waypoint is passed or a previous flight segment safely passed is available, to all nodes according to steps for encryption/decryption operated repeatedly.

7. The UAV logistics operation and air traffic control method based on blockchain technology as claimed in claim 1 wherein multiple blockchains of different airways are connected with one another in series to create a blockchain inside another blockchain for B2B scenarios of communications, transactions or liquidations between UAV transportation task management systems operated by different organizations.

8. The UAV logistics operation and air traffic control method based on blockchain technology as claimed in claim 1 wherein the flight status of the flight having passed the waypoint is broadcasted to other members on the network through a token with which safe barrier-free flight segments to be passed are known to other flights and several available flight segments that have been passed are released for update of the token.

9. The UAV logistics operation and air traffic control method based on blockchain technology as claimed in claim 1 wherein several air channels are developed in an identical flight segment by planning the airway in airspace based on the concept of road, both a constant UAV flying speed and a safe separation distance between UAVs as required are set according to a blockchain-based node reply mechanism, and multiple flights are arranged in different air channels inside the identical flight segment simultaneously or deployed at front and rear ends of an identical air channel for optimum utilization of the airway.

10. The UAV logistics operation and air traffic control method based on blockchain technology as claimed in claim 9 wherein planning and design of the airway depends on defined flight parameters, which comprise a safe width of an air channel, a basic length of the flight segment, a required safe separation distance, a flight speed, a blockchain mechanism attributed to a modeling resolution for maximum utilization of an airway and safe air traffic.

* * * * *